US012697890B2

(12) United States Patent
Yokoyama et al.

(10) Patent No.: US 12,697,890 B2
(45) Date of Patent: Aug. 4, 2026

(54) GROUND POWER SUPPLY APPARATUS AND POWER SUPPLY METHOD

(71) Applicant: TOYOTA JIDOSHA KABUSHIKI KAISHA, Aichi-ken (JP)

(72) Inventors: Daiki Yokoyama, Gotemba (JP);
Toshiya Hashimoto, Miyoshi (JP);
Shuntaro Okazaki, Shizuoka-ken (JP);
Shogo Tsuge, Fuji (JP); Kazuhisa Matsuda, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 661 days.

(21) Appl. No.: 18/334,378

(22) Filed: Jun. 14, 2023

(65) Prior Publication Data

US 2023/0415589 A1      Dec. 28, 2023

(30) Foreign Application Priority Data

Jun. 23, 2022    (JP) ................................. 2022-101084

(51) Int. Cl.
| | |
|---|---|
| *H02J 50/00* | (2016.01) |
| *B60L 53/126* | (2019.01) |
| *B60L 53/30* | (2019.01) |
| *B60L 53/66* | (2019.01) |
| *H02J 50/12* | (2016.01) |

(52) U.S. Cl.
CPC ........... *B60L 53/126* (2019.02); *B60L 53/305* (2019.02); *B60L 53/66* (2019.02); *H02J 50/005* (2020.01); *H02J 50/12* (2016.02)

(58) Field of Classification Search
CPC ...... B60L 53/126; B60L 53/66; B60L 53/305; H02J 50/12; H02J 50/005
See application file for complete search history.

(56) References Cited

U.S. PATENT DOCUMENTS

| | | | | |
|---|---|---|---|---|
| 10,042,359 B1 * | 8/2018 | Konrardy | ........... | G01C 21/3461 |
| 10,403,113 B1 | 9/2019 | Antar et al. | | |
| 2019/0202304 A1 * | 7/2019 | Moghe | .................... | B60L 53/38 |
| 2022/0252678 A1 * | 8/2022 | Hashimoto | ........ | G01C 21/3415 |

FOREIGN PATENT DOCUMENTS

| | | |
|---|---|---|
| CN | 206224808 U | 6/2017 |
| CN | 110992692 A | 4/2020 |
| JP | 2018-157686 A | 10/2018 |
| JP | 2021-064153 A | 4/2021 |

* cited by examiner

*Primary Examiner* — Robert Grant
(74) *Attorney, Agent, or Firm* — HAUPTMAN HAM, LLP

(57) ABSTRACT

A control device for a ground power supply apparatus judges if it has received from one moving body among a plurality of moving bodies a first signal notifying it that the one moving body has become an immobilized state on an electrified road at which a ground power supply apparatus has been installed. The control device, if receiving the first signal, when receiving from another moving body among the plurality of moving bodies, a power supply request signal requesting noncontact power supply at the ground power supply apparatus or an approach signal notifying it of approach the ground power supply apparatus, sends to the other moving body originating the power supply request signal or approach signal a second signal notifying it that there is a moving body in an immobilized state present on the electrified road.

7 Claims, 8 Drawing Sheets

Figure 5:
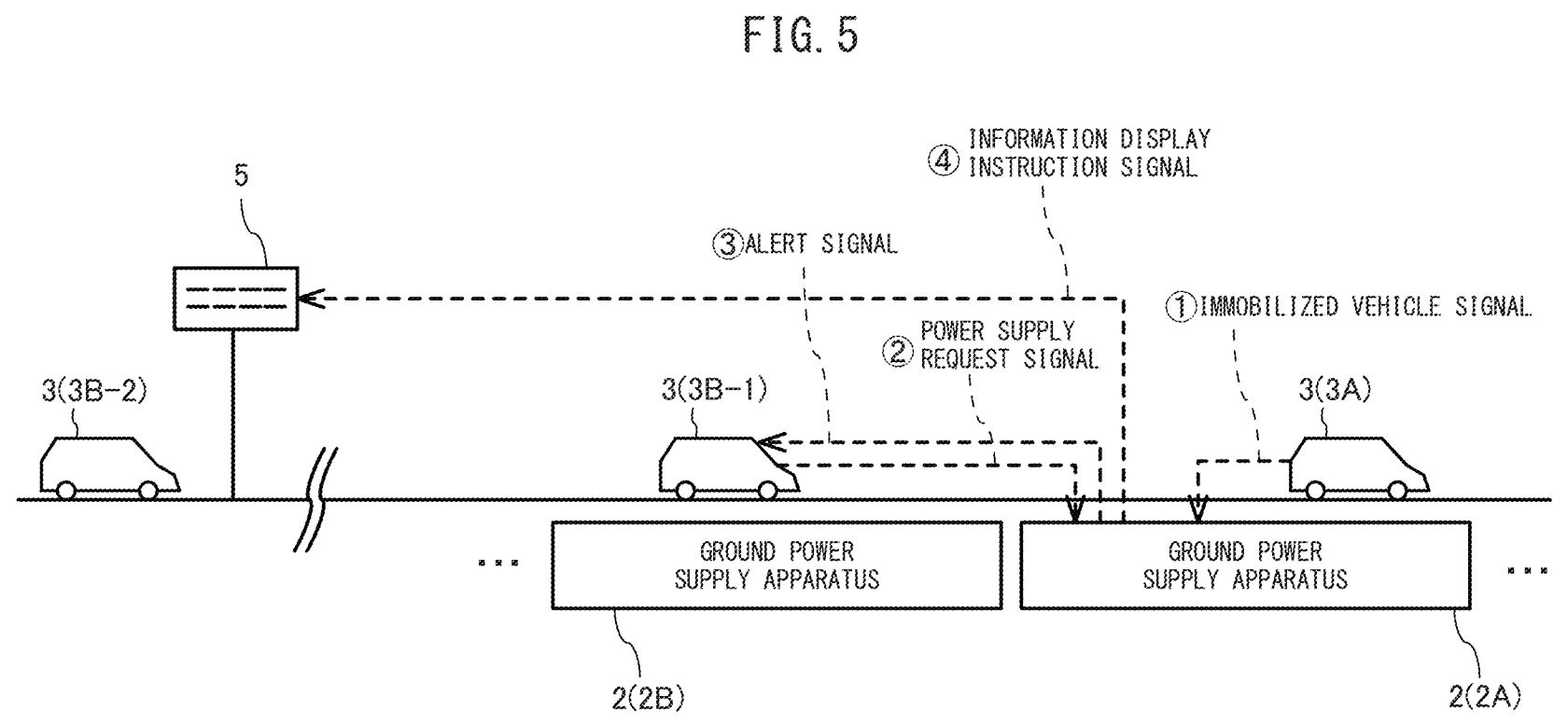

① IMMOBILIZED VEHICLE SIGNAL

④ INFORMATION DISPLAY
   INSTRUCTION SIGNAL

② POWER SUPPLY
   REQUEST SIGNAL

③ ALERT SIGNAL

3(3A)

GROUND POWER
SUPPLY APPARATUS

2(2A)

3(3B-1)

GROUND POWER
SUPPLY APPARATUS

2(2B)

3(3B-2)

5

GROUND POWER SUPPLY APPARATUS AND POWER SUPPLY METHOD

RELATED APPLICATIONS

The present application claims priority of Japanese Patent Application No. 2022-101084 filed Jun. 23, 2022, the disclosure of which is hereby incorporated by reference herein in its entirety.

FIELD

The present disclosure relates to a ground power supply apparatus and a power supply method.

BACKGROUND

Japanese Unexamined Patent Publication No. 2018-157686 discloses a noncontact power supply system which utilizes a transmission system such as magnetic field coupling (electromagnetic induction), electric field coupling, magnetic field resonant coupling (magnetic field resonance), and electric field resonant coupling (electric field resonance) to transmit electric power from a ground power supply apparatus provided on the ground to a running vehicle by noncontact means.

SUMMARY

On a road at which a ground power supply apparatus is installed (below, referred to as an "electrified road"), for example, sometimes a vehicle breakdown or some other factor causes a vehicle to become immobilized. In such a case, if ending up carelessly exiting the vehicle, a person is liable to end up being physically exposed to a leakage magnetic field from the ground power supply apparatus generated when transmitting power to the vehicle. For this reason, when some sort of factor on an electrified road causes a vehicle to become immobilized, it is desirable to wait inside the vehicle without exiting it until transmission of power is confirmed to have stopped. However, if a following vehicle is slow to recognize such an immobilized vehicle present ahead, an accident etc. is liable to occur between the following vehicle and the immobilized vehicle due to the immobilized vehicle and occupants of the immobilized vehicle are liable to be endangered.

The present disclosure was made focusing on such a problem and has as its object to keep an accident from occurring due to a vehicle when the vehicle is immobilized on a road.

To solve the above problem, a ground power supply apparatus according to one aspect of the present disclosure comprises a communication device able to communicate with a plurality of moving bodies, a power transmission device for supplying power to a moving body by noncontact means, and a control device. The control device is configured so as to judge whether it has received from one moving body among the plurality of moving bodies a first signal notifying it that the one moving body has become an immobilized state on an electrified road in which a ground power supply apparatus is installed and, if receiving the first signal, when receiving from another moving body among the plurality of moving bodies, a power supply request signal requesting noncontact power supply at the ground power supply apparatus or an approach signal notifying it of approach to the ground power supply apparatus, to send to the other moving body originating the power supply request signal or approach signal a second signal notifying it of the presence of a moving body in an immobilized state on the electrified road.

Further, to solve the above problem, a ground power supply apparatus according to another aspect of the present disclosure comprises a communication device able to communicate with a plurality of moving bodies, a power transmission device for supplying power to a moving body by noncontact means, and a control device. The control device is configured so as to judge whether a moving body has become an immobilized state on an electrified road in which a ground power supply apparatus is installed and, if the moving body has become an immobilized state on an electrified road in which a ground power supply apparatus is installed, when receiving from another moving body among the plurality of moving bodies a power supply request signal requesting noncontact power supply at the ground power supply apparatus or an approach signal notifying it of approach to the ground power supply apparatus, sending to the other moving body originating the power supply request signal or approach signal a signal notifying it of the presence of a moving body in an immobilized state on the electrified road.

Further, to solve the above problem, a power supply method by a ground power supply apparatus according to another aspect of the present disclosure comprising a communication device configured to be able to communicate with a plurality of moving bodies, a power transmission device configured to be able to supply power to a moving body by noncontact means and a control device, comprises judging whether it has received from one moving body among the plurality of moving bodies a first signal notifying it that that one moving body has become an immobilized state on an electrified road in which the ground power supply apparatus is installed and, if receiving the first signal, when receiving from another moving body among the plurality of moving bodies a power supply request signal requesting noncontact power supply at the ground power supply apparatus or an approach signal notifying it of approach to the ground power supply apparatus, sending to the other moving body originating the power supply request signal or approach signal a second signal notifying it of the presence of a moving body in an immobilized state on the electrified road.

According to these aspects of the present disclosure, if an immobilized vehicle occurs on an electrified road, a following vehicle can be notified of the occurrence of the immobilized vehicle, so it is possible to keep an accident etc. from occurring between the following vehicle and immobilized vehicle due to the immobilized vehicle.

BRIEF DESCRIPTION OF DRAWINGS

FIG. 3 is a view showing one example of the configuration of a vehicle.

FIG. 5 is a view explaining a method of alert according to the present embodiment to a vehicle following an immobilized vehicle.

DESCRIPTION OF EMBODIMENTS

Figure 1:
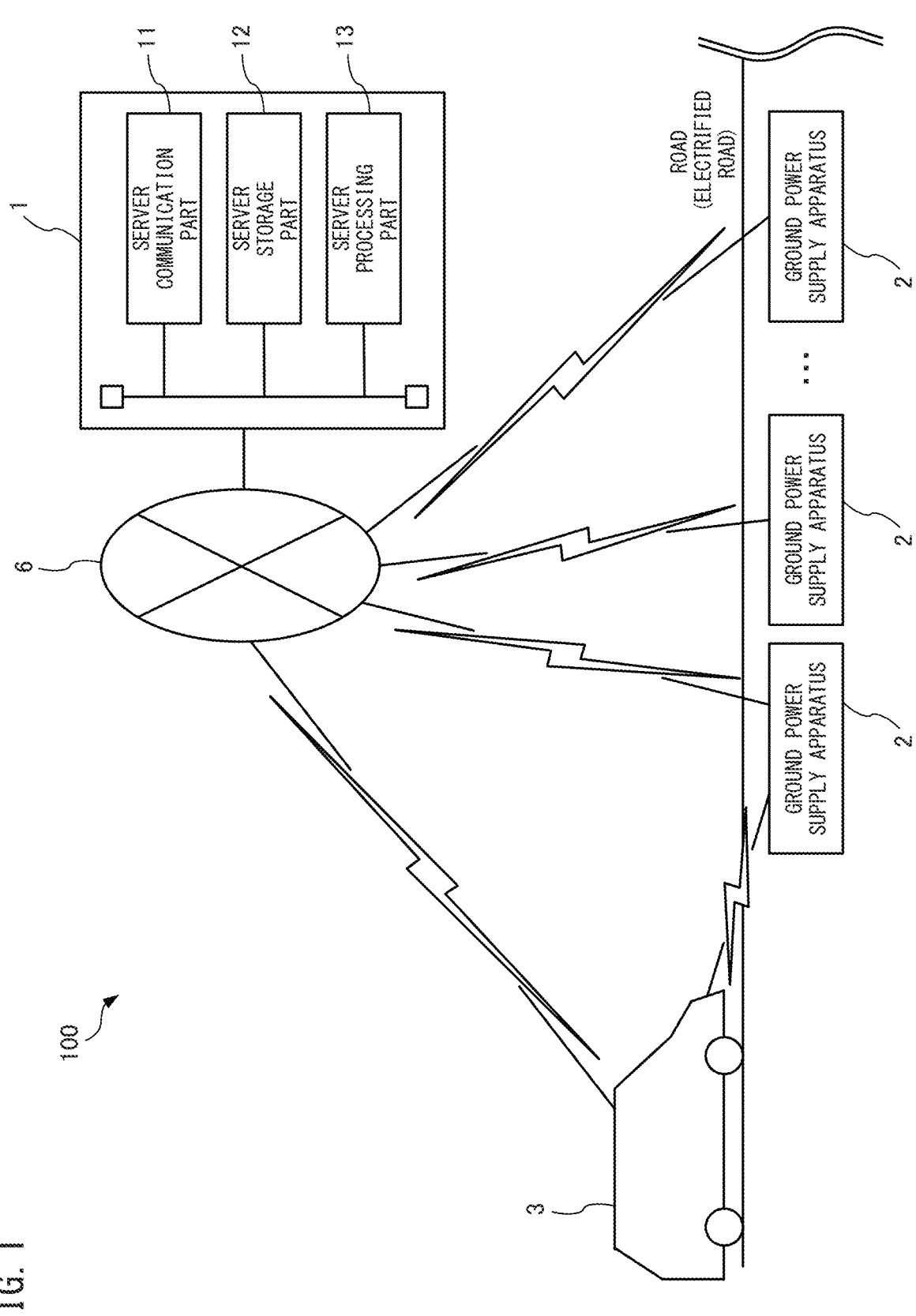
FIG. 1 is a schematic view of the configuration of a noncontact power supply system.

Below, embodiments will be explained in detail while referring to the drawings. Note that, in the following explanation, similar component elements will be assigned the same reference notations.

First Embodiment

FIG. 1 is a schematic view of the configuration of a noncontact power supply system 100 according to a first embodiment of the present disclosure.

The noncontact power supply system 100 is provided with a server 1, ground power supply apparatuses 2, and vehicles 3 as examples of moving bodies and is configured to supply power by noncontact to the vehicles 3 from the ground power supply apparatuses 2. Note that in FIG. 1, as one example of installation of the ground power supply apparatuses 2, an example is shown in which ground power supply apparatuses 2 are installed consecutively along a road at predetermined intervals.

As shown in FIG. 1, the server 1 is provided with a server communication part 11, a server storage part 12, and a server processing part 13.

The server communication part 11 has a communication interface circuit for connecting the server 1 with a network 6 and is configured to enable communication with the ground power supply apparatuses 2 and the vehicles 3 through the network 6.

The server storage part 12 has an HDD (hard disk drive) or SSD (solid state drive), optical recording medium, semiconductor memory, or other storage medium and stores various computer programs and data etc. used for processing at the processing part 13.

The server processing part 13 is provided with a processor having one or more CPUs (central processing units) and their peripheral circuits. The server processing part 13 performs various processing based on the various computer programs stored in the server storage part 12.

If the server processing part 13 and in turn the server 1 receives a signal requesting utilization of the noncontact power supply system 100 from a vehicle 3, it confirms whether that vehicle 3 has the right to utilize the same. If confirmation is obtained, it transfers various information with the vehicle 3 and ground power supply apparatuses 2 so as to enable the vehicle 3 to receive power supply from the ground power supply apparatuses 2. Details of this transfer will be explained later referring to FIG. 4.

Next, referring to FIG. 2 and FIG. 3, the configurations of a ground power supply apparatus 2 and a vehicle 3 according to the present embodiment will be explained.

Figure 2:
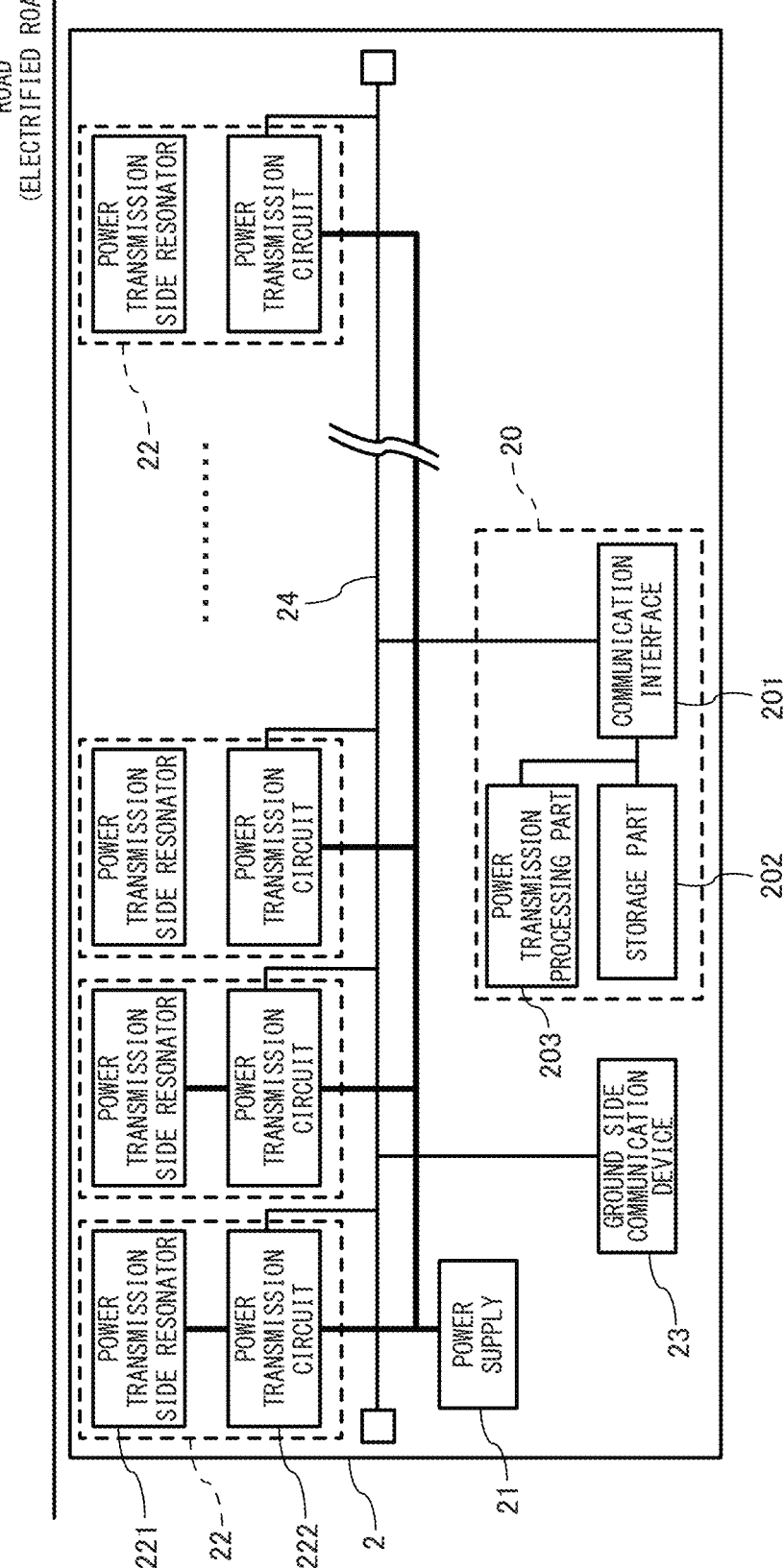
FIG. 2 is a view showing one example of the configuration of a ground power supply apparatus.

FIG. 2 is a view showing one example of the configuration of a ground power supply apparatus 2 according to the present embodiment.

As shown in FIG. 2, the ground power supply apparatus 2 is provided with a power supply 21, power transmission device 22, ground side communication device 23, and power transmission control device 20. The power transmission device 22 and the ground side communication device 23 are connected to the power transmission control device 20 through an internal network 24 of the ground power supply apparatus 2 based on the CAN (controller area network) or other standard. Note that FIG. 2 shows an example where the ground power supply apparatus 2 has a plurality of power transmission devices 22, but it may also have a single power transmission device 22.

The power supply 21 supplies power to the power transmission device 22. The power supply 21 is, for example, a commercial AC power supply supplying single-phase AC power. Note that the power supply 21 may also be another AC power supply supplying three-phase AC power or may be a DC power supply such as a fuel cell. Further, FIG. 2 shows an example where power is supplied to the individual power transmission devices 22 by a common power supply 21, but a dedicated power supply may also be prepared for each power transmission device to supply power.

The power transmission device 22 is a device for transmitting power supplied from the power supply 21 to a vehicle 3 and is provided with a power transmission side resonator 221 and a power transmission circuit 222.

The power transmission side resonator 221 is a resonance circuit including a power transmission coil and is configured to resonate by a predetermined resonance frequency fp. In the present embodiment, the resonance frequency $f_0$ is set to 85 kHz determined by the SAE TIR J2954 standard as the frequency band for noncontact power transmission, but the disclosure is not limited to this. The vehicle 3 is provided with a power reception side resonator 311 corresponding to this power transmission side resonator 221. The power reception side resonator 311 is a resonance circuit including a power reception coil and is configured to resonate at the same resonance frequency $f_0$ as the power transmission side resonator 221. By making the power transmission side resonator 221 resonate, the power transmission coil of the power transmission side resonator 221 and the power reception coil of the power reception side resonator 311 disposed spaced apart are magnetically coupled and power is transmitted by noncontact from the power transmission device 22 to the power reception device 31.

The power transmission circuit 222 is an electrical circuit provided with a rectifier and inverter and is configured to be controlled by the power transmission control device 20 to be able to convert AC power supplied from the power supply 21 to DC power by the rectifier and to convert the DC power by the inverter to the desired AC power able to make the power transmission side resonator 221 resonate and then supply it to the power transmission side resonator 221. Note that the configuration of the power transmission circuit 222 is not limited to such a configuration and may be suitably changed in accordance with the type of the power supply 21.

The ground side communication device 23 is provided with an antenna and a signal processing circuit for performing various processing relating to wireless communication such as modulation and demodulation of a wireless signal and is configured to be able to communicate with the outside, for example, a server 1 or ground power supply apparatus 2 or later explained electric light signboard or other information display device 5 (see FIG. 5). The ground side communication device 23 and the vehicle 3 may, for example, directly communicate with each other by utilizing narrow area wireless communication and indirectly communicate through the server 1 by utilizing wide area wireless communication. If the ground side communication device 23 receives a wireless signal from the outside, it transfers that wireless signal to the power transmission control device 20. Further, if the ground side communication device 23 is transferred a signal to the outside from the power transmission control device 20, it generates a wireless signal including that signal and sends it to the outside.

Note that wide area wireless communication is communication with, for example, a communication distance of several meters to tens of meters. As wide area wireless communication, various wireless communication systems with long communication distances can be used. For example, communication based on 4G, LTE, 5G, WiMAX, or any other communication standard can be used. Further, narrow area wireless communication is communication with a shorter communication distance than wide area wireless communication and, for example, is communication with a communication distance of up to tens of meters or so. As narrow area wireless communication, it is possible to use various near field wireless communication systems with short communication distances. For example, it is possible to use communication based on any communication standards formulated by the IEEE, ISO, IEC, etc. (for example, Bluetooth™, ZigBee™). As art for narrow area wireless communication, for example, RFID (radio frequency identification), DSRC (dedicated short range communication), etc. may be used.

The power transmission control device 20 is provided with a communication interface 201, storage part 202, and power transmission processing part 203.

The communication interface 201 is a communication interface circuit for connecting the power transmission control device 20 to the internal network 24 of the ground power supply apparatus 2.

The storage part 202 has an HDD or SSD, optical recording medium, semiconductor memory, or other storage medium and stores various computer programs and data used for processing at the power transmission processing part 203.

The power transmission processing part 203 is provided with a processor having one or more CPUs and their peripheral circuits. The power transmission processing part 203 performs various processing based on various computer programs stored in the storage part 202. The content of the processing performed at the power transmission processing part 203 and in turn the power transmission control device 20 will be explained later while referring to FIG. 6 and FIG. 7.

Figure 3:
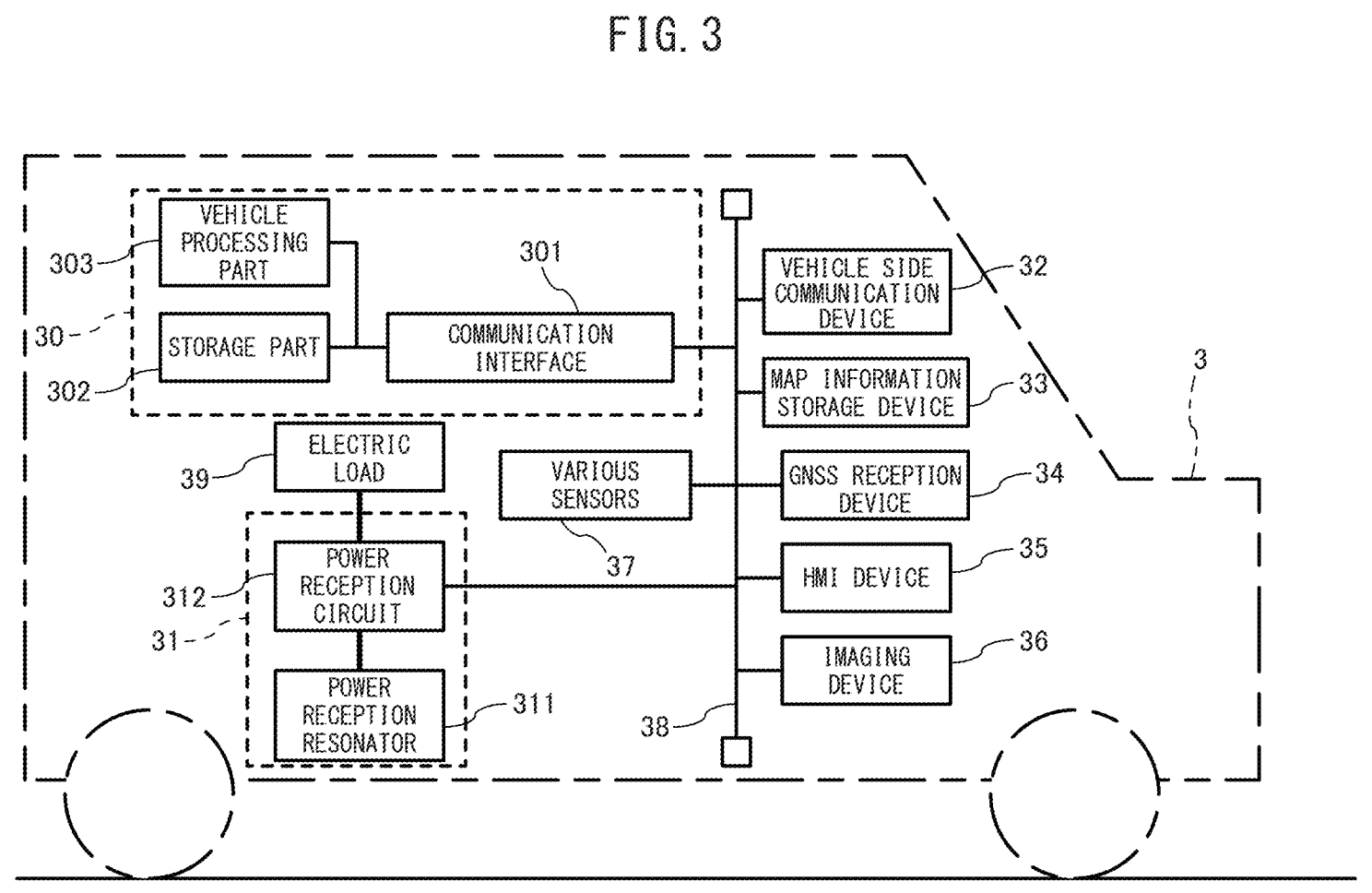

FIG. 3 is a view showing one example of the configuration of a vehicle 3 according to the present embodiment. The vehicle 3 may be a manual driving vehicle or may be an automated driving vehicle.

The vehicle 3 according to the present embodiment is provided with a power reception device 31, vehicle side communication device 32, map information storage device 33, GNSS reception device 34, HMI device 35, imaging device 36, various sensors 37, and vehicle control device 30. The vehicle side communication device 32, map information storage device 33, GNSS reception device 34, HMI device 35, imaging device 36, and various sensors 37 are connected to the vehicle control device 30 through an internal vehicle network 38 based on the CAN or other standard.

The power reception device 31 is provided with a power reception side resonator 311 and a power reception circuit 312.

The power reception side resonator 311, as explained above, is a resonance circuit including a power reception coil and is configured to resonate at the same resonance frequency $f_0$ as the power transmission side resonator 221.

The power reception circuit 312 is an electrical circuit provided with a rectifier and DC/DC converter and is configured to be controlled by the vehicle control device 30 to be able to convert AC power output from the power reception side resonator 311 to DC power by the rectifier and supply it through the DC/DC converter to the electric load 39. As the electric load 39, for example, a battery, electric motor, etc. may be mentioned, but the disclosure is not particularly limited to this. In the present embodiment, the power reception circuit 312 is connected to a battery as the electric load 39.

The vehicle side communication device 32 is provided with an antenna and various signal processing circuits related to wireless communication such as modulation and demodulation of wireless signals and is configured so as to be able to communicate with the outside, for example, the server 1 or ground power supply apparatus 2 or later explained electric light signboard or other information display device 5 (see FIG. 5). The vehicle side communication device 32 and the ground power supply apparatus 2 may, for example, directly communicate with each other by utilizing narrow area wireless communication and indirectly communicate through the server 1 by utilizing wide area wireless communication. If the vehicle side communication device 32 receives a wireless signal from the outside, it transfers that wireless signal to the vehicle control device 30. Further, if the vehicle side communication device 32 is transferred a signal to the outside from the vehicle control device 30, it generates a wireless signal including that signal and sends it to the outside.

The map information storage device 33 stores map information including positional information of roads, information relating to road types (for example, information relating to whether roads are highways or electrified roads etc.), etc.

The GNSS reception device 34 receives electric waves from satellites to identify the longitude and latitude of the vehicle 3 and detect the current position of the vehicle 3. The GNSS reception device 34 transmits the detected current position information of the vehicle 3 to the vehicle control device 30.

The HMI device 35 is an interface for transferring information with the vehicle occupants. The HMI device 35 according to the present embodiment is provided with a display and speaker for providing the vehicle occupants with various information and a touch panel for the vehicle occupants to be able to perform operations to input information on the display. Naturally, instead of a touch panel or along with a touch panel, operating buttons and other input devices may also be provided. The HMI device 35 transmits input information input by the vehicle occupants to various devices requiring that input information and displays information received through the internal vehicle network 38 on the display etc. to provide it to the vehicle occupants.

The imaging device 36 captures and outputs video of the surroundings of the vehicle 3. The video captured by the imaging device 36 is, for example, utilized for the vehicle control device 30 to detect objects in the surroundings of the vehicle 3.

The various sensors 37 are sensors used when the vehicle control device 30 controls the vehicle 3. As such sensors 37, for example, if the vehicle 3 is an automated driving vehicle, distance measurement sensors etc. for measuring and outputting the distance to an object present in the surroundings of the vehicle 3 for each direction—required for the vehicle control device 30 (automated driving system) to automatically drive the vehicle 3 etc. may be mentioned. If the vehicle 3 is an automated driving vehicle, the vehicle control device 30 automatically performs driving operations relating to acceleration, steering, and braking so that the vehicle 3 automatically runs based on the signals etc. output from the distance measurement sensors etc.

The vehicle control device 30 is provided with a communication interface 301, storage part 302, and vehicle processing part 303.

The communication interface 301 is a communication interface circuit for connecting the vehicle control device 30 to the internal vehicle network 38.

The storage part 302 has an HDD or SSD, optical recording medium, semiconductor memory, or other storage medium and stores various computer programs and data used for processing at the vehicle processing part 303.

The vehicle processing part 303 is provided with a processor having one or more CPUs and their peripheral circuits. The vehicle processing part 303 performs various processing based on the various computer programs stored in the storage part 302. The content of the processing performed at the vehicle processing part 303 and in turn the vehicle control device 30 will be explained later while referring to FIG. 6 and FIG. 7.

Figure 4:
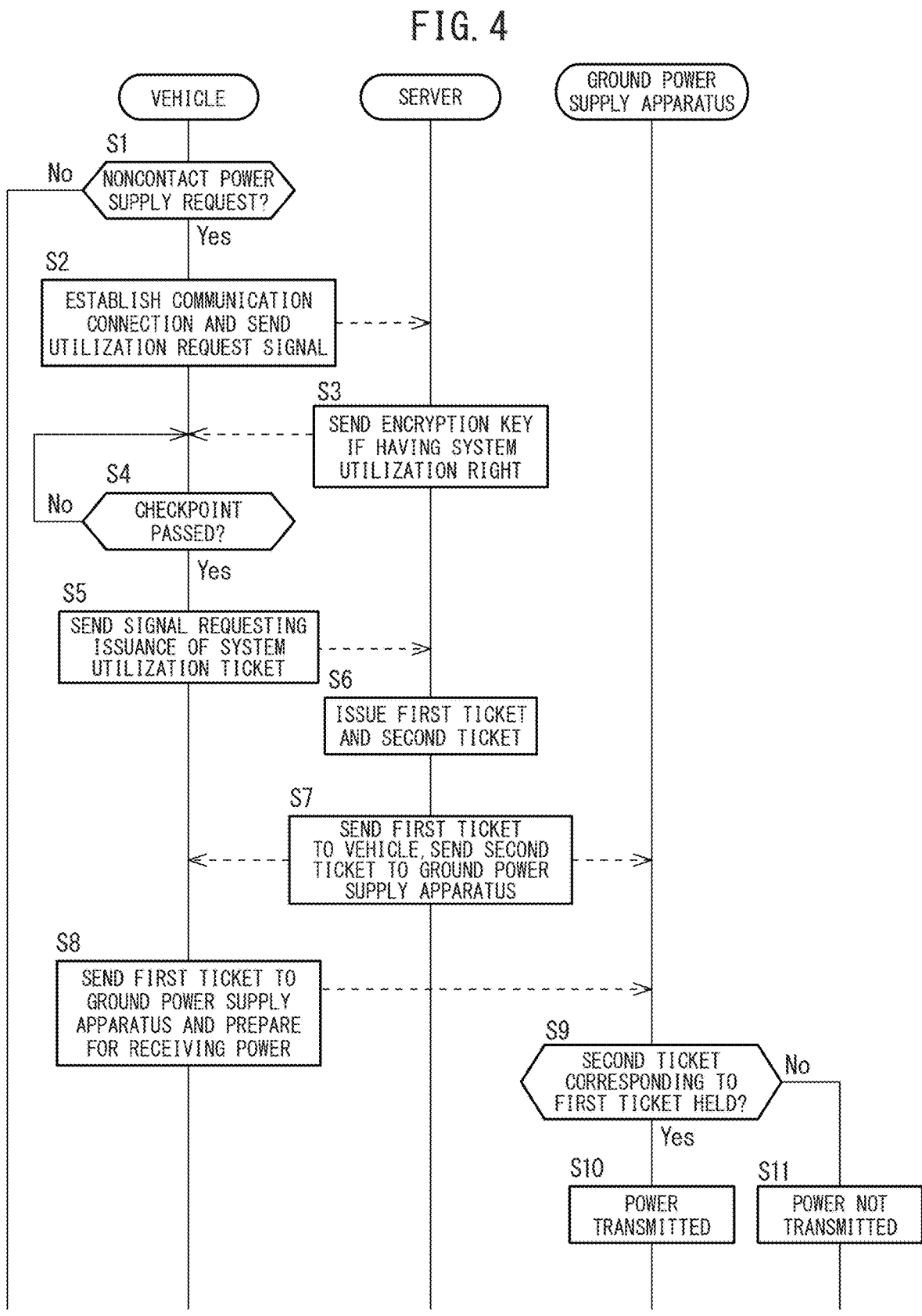
FIG. 4 is an operation sequence diagram for explaining the content of basic processing performed at a server, ground power supply apparatus, and vehicle for noncontact power supply.

FIG. 4 is an operation sequence diagram for explaining the content of the basic processing (computer program) performed at the server 1, ground power supply apparatus 2, and vehicle 3 for noncontact power supply.

At step S1, the vehicle control device 30 judges if the vehicle 3 in which the vehicle control device 30 is mounted, that it, the "host vehicle 3", is requesting noncontact power supply. If the host vehicle 3 is requesting noncontact power supply, the vehicle control device 30 proceeds to the processing of step S2. On the other hand, if the host vehicle 3 is not requesting noncontact power supply, the vehicle control device 30 ends the current processing. In the present embodiment, the vehicle occupants are able to manually switch between requesting and not requesting noncontact power supply through the HMI device 35, but the disclosure is not limited to this. It is also possible to have a request for noncontact power supply made or not made automatically switched in accordance with the state of the electric load 39 (for example, state of charge of battery, load of electric motor, etc.)

At step S2, the vehicle control device 30, for example, performs a three-way handshake to establish a communication connection with the server 1, then sends the server 1 a signal requesting utilization of the noncontact power supply system 100. This signal requesting utilization, for example, includes various information required for utilizing the noncontact power supply system 100 (for example, authentication information etc.)

At step S3, the server 1 confirms based on the authentication information etc. whether the vehicle 3 originating the signal requesting utilization has the right to utilize the noncontact power supply system 100 and sends the confirmed vehicle 3 an encryption key for decrypting an encrypted system utilization ticket. The system utilization ticket is a virtual ticket for utilizing the noncontact power supply system 100.

At step S4, the vehicle control device 30 judges whether a checkpoint set at any point before the electrified road section has been passed. If the checkpoint has been passed, the vehicle control device 30 proceeds to the processing of step S5. On the other hand, if the checkpoint has not been passed, the vehicle control device 30 again judges if the checkpoint has been passed after the elapse of a predetermined time.

Whether the checkpoint has been passed, for example, if a gate is set at the checkpoint, can be judged by the vehicle control device 30 receiving a signal emitted by the gate when the checkpoint is passed. At that time, the vehicle control device 30 can receive checkpoint information including positional information of the checkpoint passed etc. from the gate. Further, for example, if checkpoint information is included in the map information or if checkpoint information can be received from the server 1, it is also possible to judge whether the checkpoint has been passed based on the positional information of the host vehicle and the positional information of the checkpoint. In this way, the method of judging whether the checkpoint has been passed is not particularly limited.

Note that, in the present embodiment, at this step S4, it is judged whether a checkpoint has been passed, but the disclosure is not limited to this. For example, it is also possible to judge if a checkpoint has been approached.

Whether a checkpoint has been approached, for example, if a device sending a signal to a vehicle 3 positioned within a certain range based on the checkpoint is set at the checkpoint, can be judged by the vehicle control device 30 by receiving the signal emitted from that device. The disclosure is not limited to this. This can also be judged based on positional information of the host vehicle and positional information of the checkpoint. The certain range based on the checkpoint can, for example, be made part of the road section before entering the electrified road section if a predetermined range of road section where a traffic light has to be waited to change is made the electrified road section so as to enable a vehicle 3 waiting for a traffic light to change to be supplied with power by noncontact.

At step S5, the vehicle control device 30 sends the server 1 a request for issuance of a system utilization ticket of a virtual ticket for utilization of the noncontact power supply system 100. The signal requesting issuance of a system utilization ticket includes identification information of the host vehicle and checkpoint information.

At step S6, if receiving a request for issuance of a system utilization ticket, the server 1 identifies the vehicle 3 originating the request for issuance based on the vehicle identification information included in the request for issuance. Further, the server 1 issues as a first ticket a system utilization ticket for transmission to the identified vehicle 3 originating the request for issuance and unique to each vehicle 3 having the right to utilize the noncontact power supply system 100. Further, the server 1 simultaneously with this issues as a second ticket a system utilization ticket corresponding to the first ticket and used for transmission to the ground power supply apparatus 2.

At step S7, the server 1 sends the encrypted first ticket to the vehicle 3 originating the request for issuance of a system utilization ticket and sends a second ticket to each ground power supply apparatus 2 linked with the checkpoint. A "ground power supply apparatus 2 linked with the checkpoint" is a ground power supply apparatus 2 installed at the electrified road section which the vehicle 3 passing the checkpoint may run over. The server storage part 12 of the server 1 according to the present embodiment stores in advance the ground power supply apparatus 2 linked with the checkpoint for each checkpoint.

At step S8, the vehicle control device 30 decrypts the received first ticket using the encryption key and starts periodic and direct transmission of a power supply request signal including the decrypted first ticket to the ground power supply apparatus 2 by narrow area wireless communication through the vehicle side communication device 32. Further, simultaneously with this, the vehicle control device 30 controls the power transmission device 22 so as to enable its host vehicle 3 to receive power when running over the ground power supply apparatus 2.

At step S9, if receiving a power supply request signal by a predetermined communication strength (received signal strength) or more, the power transmission control device 20 judges if a second ticket corresponding to the first ticket included in the power supply request signal has already been received from the server 1, that is, if it holds a second ticket corresponding to the received first ticket. If holding a second ticket corresponding to the first ticket, the power transmission control device 20 proceeds to the processing of step S10. On the other hand, if not holding a second ticket corresponding to the first ticket, the ground power supply apparatus 2 proceeds to the processing of step S11.

At step S10, the power transmission control device 20 judges that the vehicle 3 which will run over it is a vehicle requesting noncontact power supply and obtaining permission to utilize the noncontact power supply system 100 (below, referred to as the "vehicle to be supplied with power") and controls the power transmission device 22 so as to be able to transmit power when that vehicle 3 is running over it.

At step S11, the power transmission control device 20 judges that the vehicle 3 running on it is not a vehicle to be supplied with power and controls the power transmission device 22 so as not to transmit power even if that vehicle 3 runs on it.

In this regard, if a vehicle 3 breaks down on an electrified road or becomes stuck and is stalled or if caught in a large scale vehicle congestion due to vehicles stalled due to breakdown or bad weather etc., sometimes movement from the stopped position becomes difficult for some reason or another. In such a case, if carelessly ending up exiting from a vehicle 3, one is liable to end up being physically exposed to the leakage magnetic field generated at the time of power transmission from the ground power supply apparatus 2 to the vehicle 3. For this reason, if a vehicle becomes immobilized on an electrified road due to some sort of reason, it is desirable to wait in the vehicle without exiting it until it is confirmed power transmission has been stopped.

However, if such an immobilized vehicle occurs, if the vehicle following the immobilized vehicle is slow to recognize the immobilized vehicle present ahead, an accident etc. due to the immobilized vehicle is liable to occur between the following vehicle and the immobilized vehicle and the occupants of the immobilized vehicle are liable to be endangered.

Therefore, in the present embodiment, if an immobilized vehicle has occurred on the electrified road, a following vehicle with a high possibility of running on the electrified road on which the immobilized vehicle has stopped is alerted to enable it to be notified that an immobilized vehicle has stopped on the electrified road ahead. Note that, in the following explanation, to facilitate understanding of the disclosure in accordance with need, a vehicle which has fallen into an immobilized state among the vehicles 3 will be referred to as the "immobilized vehicle 3A" while vehicles running behind the immobilized vehicle 3A will be referred to as the "following vehicles 3B".

FIG. 5 is a view explaining a method of alerting the following vehicles 3B-1 and 3B-2 of the immobilized vehicle 3A according to the present embodiment. In FIG. 5, the immobilized vehicle 3A has fallen into an immobilized state on an electrified road at which a ground power supply apparatus 2A has been installed. Two following vehicles 3B-1 and 3B-2 are running on a back road leading to the electrified road at which the ground power supply apparatus 2A has been installed.

As shown in FIG. 5, if the host vehicle has fallen into an immobilized state, the immobilized vehicle 3A sends the ground power supply apparatus 2A supplying the host vehicle with power by noncontact an immobilized vehicle signal notifying it that an immobilized vehicle has occurred at the power supply section of the ground power supply apparatus 2A.

If receiving an immobilized vehicle signal, the ground power supply apparatus 2A takes power supply stop action for stopping noncontact power supply to the vehicle 3A and, if subsequently receiving a power supply request signal from the following vehicle 3B-1 by a predetermined communication strength or more, sends the following vehicle 3B-1 originating the power supply request signal an alert signal notifying it that there is the immobilized vehicle 3A on the electrified road ahead in the vehicle advance direction.

Due to this, if the following vehicle 3B-1 is a manual driving vehicle, the driver of that following vehicle 3B-1 can learn of the presence of the immobilized vehicle 3A in the power supply section of the ground power supply apparatus 2A at which the immobilized vehicle 3A has occurred before entering the power supply section. Further, for example, if the following vehicle 3B-1 is an automated driving vehicle, the automated driving system of that following vehicle 3B-1 can learn of the presence of the immobilized vehicle 2A in the power supply section of the ground power supply apparatus 2A at which the immobilized vehicle 3A has occurred before entering the power supply section. For this reason, the driver or the automated driving system of the following vehicle 3B-1 can drive the vehicle assuming the presence of the immobilized vehicle 3A, so it is possible to keep an accident etc. from occurring due to the immobilized vehicle 3A.

Further, if, like in the present embodiment, receiving an immobilized vehicle signal, then receiving a power supply request signal from the following vehicle 3B-1 by a predetermined communication strength or more, it is possible to obtain the following such actions and effects by sending an alert signal to the following vehicle 3B-1 originating the power supply request signal.

That is, when saying that a power supply request signal from a certain vehicle 3 has been received by the ground power supply apparatus 2 by a predetermined communication strength or more, this is when the vehicle 3 originating the power supply request signal has approached the ground power supply apparatus 2 to which that signal has been sent by a close distance. Therefore, when saying that a power supply request signal from a certain vehicle 3 has been received by the ground power supply apparatus 2 by a predetermined communication strength or more, in other words this is when the vehicle 3 originating the power supply request signal is anticipated to enter the power supply section of the ground power supply apparatus 2 to which that signal has been sent.

The ground power supply apparatus 2 can send alert signals randomly to a plurality of vehicles 3 in the surroundings when receiving an immobilized vehicle signal, but if doing this, for example, vehicles 3 running on the oncoming lanes and other vehicles 3 not requiring alert would also end up being alerted. Therefore, as shown in FIG. 5, by making it so that only when a ground power supply apparatus 2A receiving an immobilized vehicle signal, that is, a ground power supply apparatus 2A in the power supply section of which an immobilized vehicle 3A has stopped, receives a power supply request signal by a predetermined communication strength or more, is the following vehicle 3B-1 originating the power supply request signal sent an alert signal, it is possible to suitably alert the following vehicle 3B-1 with a high possibility of entering the power supply section of the ground power supply apparatus 2A at which the immobilized vehicle 3A has stopped.

Further, as shown in FIG. 5, in the present embodiment, if the ground power supply apparatus 2A receives an immobilized vehicle signal, it is made to send to an electric light signboard installed at a road behind in the vehicle advance direction leading to the electrified road at which the ground power supply apparatus 2A is installed an information display request signal for making that information display device 5 display the fact that there is an immobilized vehicle 3A on the electrified road ahead in the vehicle advance direction.

Due to this, the information display device 5 can be made to display information notifying that there is an immobilized vehicle 3A present on the electrified road ahead in the vehicle advance direction. For this reason, if the following vehicle 3B-2 passing the information display device 5 on which that information had been displayed is a manual driving vehicle, the driver of the following vehicle 3B-2 can learn earlier that there is an immobilized vehicle 3A present on the electrified road ahead in the vehicle advance direction. Further, if the following vehicle 3B-2 is an automated driving vehicle, by making it possible to send information relating to the displayed content from the information display device 5 to the vehicles 3 running below the information display device 5, the automated driving system of the following vehicle 3B-2 receiving that information can learn earlier that there is an immobilized vehicle 3A present on the electrified road ahead in the vehicle advance direction.

Figure 6:
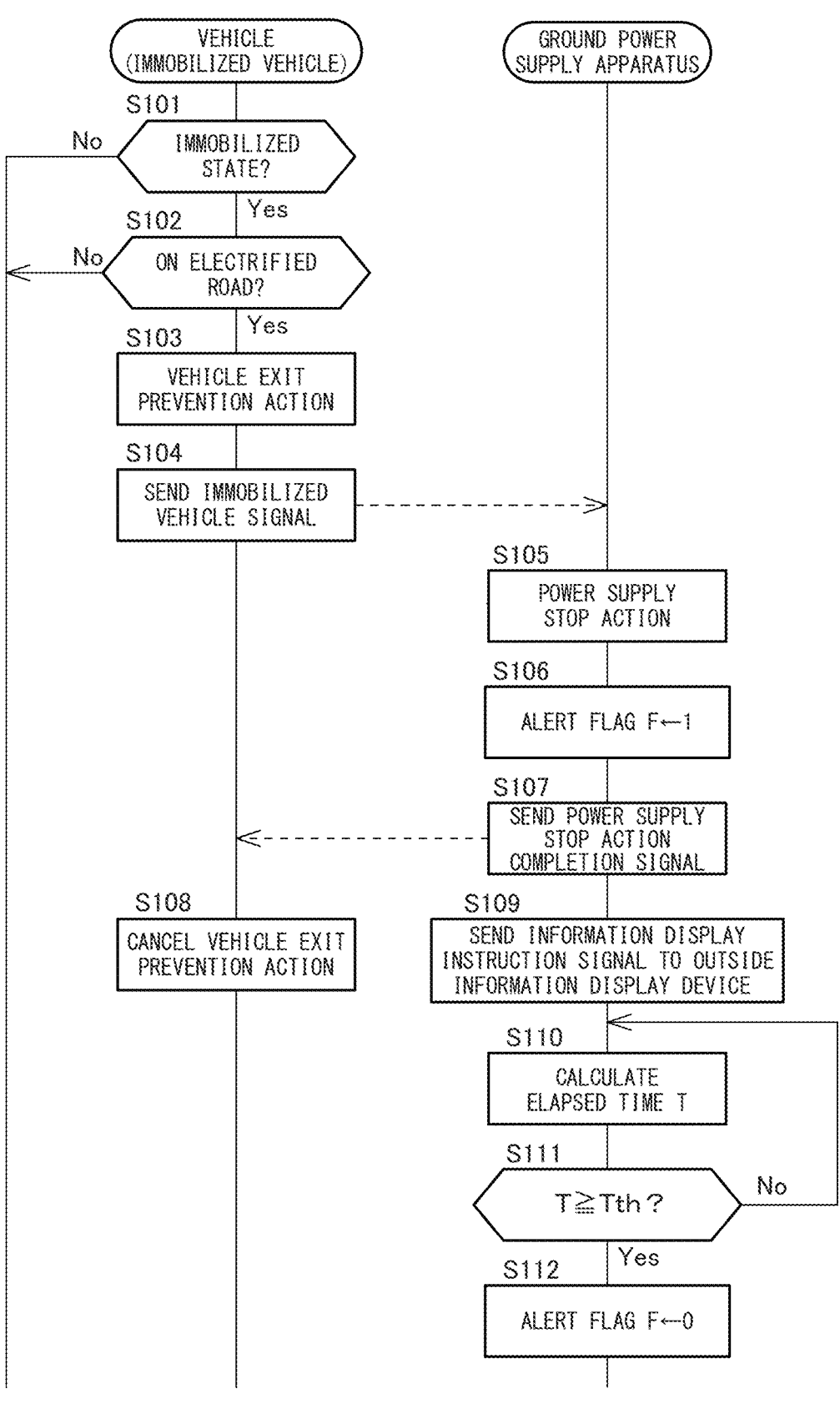
FIG. 6 is an operation sequence diagram for explaining the content of processing (computer program) according to a first embodiment of the present disclosure performed between a ground power supply apparatus and an immobilized vehicle falling in an immobilized state in a power supply section of that ground power supply apparatus.

FIG. 6 is an operation sequence diagram for explaining the content of processing (computer program) according to the present embodiment performed between the ground power supply apparatus 2A explained above with reference to FIG. 5 and the immobilized vehicle 3A which has fallen into an immobilized state in the power supply section of that ground power supply apparatus 2A.

At step S101, the vehicle control device 30 of the immobilized vehicle 3A judges whether its host vehicle 3A has fallen into an immobilized state. This judgment is, for example, performed periodically. If judging that its host vehicle 3A has fallen into an immobilized state, the vehicle control device 30 proceeds to the processing of step S102. On the other hand, if it cannot judge that its host vehicle 3A has fallen into an immobilized state, the vehicle control device 30 ends the current processing.

The method of judging whether the host vehicle 3A has fallen into an immobilized state is not particularly limited, but, for example, if the host vehicle 3 has stopped in a state where a breakdown or malfunction directly leading to inability to run has been detected by its self diagnosis function, it is possible to judge that the vehicle 3A has fallen into an immobilized state due to the vehicle breakdown. Further, for example, when the vehicle speed is slow despite the demanded torque being large or when there is a large difference in wheel speeds between the drive wheels and driven wheels (if front wheel drive, the rear wheels and if rear wheel drive, the front wheels), it is possible to judge that the host vehicle 3 has fallen into an immobilized state due to its being stuck. Further, for example, if it is possible to judge that the host vehicle 3A is caught in vehicle congestion based on imaging information of the surroundings etc., it is possible to judge that the host vehicle 3A has fallen into an immobilized state due to vehicle congestion. Further, for example, if road service is requested by the vehicle occupants through the HMI device 35 in a state where the host vehicle 3A is stopped, it is possible to judge that the host vehicle 3A has fallen into an immobilized state due to some sort of other reason.

At step S102, the vehicle control device 30 of the immobilized vehicle 3A judges whether the host vehicle 3A is present on an electrified road. If the host vehicle 3A is present on an electrified road, the vehicle control device 30 proceeds to the processing of step S103. On the other hand, if the host vehicle 3A is not present on an electrified road, the vehicle control device ends the current processing.

Whether the host vehicle 3A is present on an electrified road can, for example, be judged based on the current position information and map information. Further, for example, if changes in time of the received power etc. are recorded as power receiving history information, it is also possible to judge this based on the most recent power receiving history information. Specifically, if receiving power within the range of the most recent predetermined time, it is possible to judge that there is a high possibility of still being present on the electrified road, so it is possible to judge the vehicle is present on the electrified road.

At step S103, the vehicle control device 30 of the immobilized vehicle 3A takes vehicle exit prevention action for preventing the vehicle occupants from exiting the vehicle. In the present embodiment, as the vehicle exit prevention action, the vehicle control device 30 is made to display a warning message for preventing vehicle exiting on the display of the HMI device 35.

At step S104, the vehicle control device 30 of the immobilized vehicle 3A sends the ground power supply apparatus 2A supplying power by noncontact to the host vehicle 3A an immobilized vehicle signal notifying it that an immobilized vehicle has occurred at the power supply section of that ground power supply apparatus 2A. At this time, the vehicles 3 and ground power supply apparatus 2 may communicate directly or may communicate indirectly through the server 1.

At step S105, if receiving an immobilized vehicle signal from a vehicle 3 through the ground side communication device 23, the power transmission control device 20 of the ground power supply apparatus 2A takes action to stop the power supply. Specifically, the power transmission control device 20 controls the power transmission device 222 and in turn the power transmission device 22 so as to make it impossible to send power to the vehicle 3A.

At step S106, the power transmission control device 20 of the ground power supply apparatus 2A sets an alert flag F to 1. The alert flag F is a flag for judging whether to alert the following vehicle 3B originating the power supply request signal when receiving from the following vehicle 3B a power supply request signal by a predetermined communication strength or more. Its initial value is set to 0.

At step S107, the power transmission control device 20 of the ground power supply apparatus 2A sends the vehicle 3A originating the immobilized vehicle signal a power supply stop action completion signal notifying it that a power supply stop action has been completed. At this time, the ground power supply apparatus 2 and the vehicles 3 may communicate directly or may communicate indirectly through the server 1.

At step S108, if receiving the power supply stop action completion signal through the vehicle side communication device 32, the vehicle control device 30 of the immobilized vehicle 3A cancels the vehicle exit prevention action. If, as the vehicle exit prevention action, the vehicle control device 30 had displayed a warning message for preventing vehicle exit on the display of the HMI device 35, it ends the display of that warning message.

Note that, along with canceling the vehicle exit prevention action, for example, it is also possible to take some sort of action to notify the vehicle occupants that the vehicle exist prevention action has been cancelled, power supply has been stopped, there is no danger of leakage magnetic field even if exiting the vehicle, the vehicle may be exited, etc. In the present embodiment, a message notifying the fact that there is no danger of being exposed to a leakage magnetic field even if exiting the vehicle and that the vehicle may be exited is made to be displayed at the display of the HMI device 35.

At step S109, the power transmission control device 20 of the ground power supply apparatus 2A sends a specific outside information display device 5 installed at a road leading to the electrified road at which the device 2A is set an information display instruction signal for making that information display device 5 display the fact that there is an immobilized vehicle 3A present on the electrified road further ahead in the vehicle advance direction from the information display device 5. In the present embodiment, the information display device 5 receiving the information display instruction signal is determined in advance for each ground power supply apparatus. The ground power supply apparatus 2 and information display device 5 may communicate directly or may communicate indirectly through the server 1.

At step S110, the power transmission control device 20 of the ground power supply apparatus 2A calculates the elapsed time T from when sending the information display instruction signal.

At step S111, the power transmission control device 20 of the ground power supply apparatus 2A judges whether the elapsed time T is a predetermined time Tth or more. If the elapsed time T is the predetermined time Tth or more, the power transmission control device 20 proceeds to the processing of step S112. On the other hand, if the elapsed time T is less than the predetermined time Tth, the power transmission control device 20 again performs the processing of step S110 after a predetermined time interval.

At step S112, the power transmission control device 20 returns the alert flag F to 0.

In this way, in the present embodiment, the elapsed time T from when sending the information display instruction signal is calculated and the alert flag F is returned to 0 when the elapsed time T becomes the predetermined time Tth or more. This is due to the following reason.

That is, if the elapsed time T from when sending the information display instruction signal becomes a certain time or more, the following vehicle 3B-2 seeing the display on the information display device 5 will approach the ground power supply apparatus 2A, send a power supply request signal, and enter the power supply section of the ground power supply apparatus 2A. The occupants of the following vehicle 3B-2 will have already learned an immobilized vehicle 3A was stopped on the electrified road by viewing the display of the information display device 5, so the need for again sending an alert signal to the following vehicle 3B-2 to again alert it can be said to be low.

Therefore, in the present embodiment, when the elapsed time T becomes a predetermined time Tth or more, the alert flag F is returned to 0 and an alert signal is made not to be transmitted even if receiving a power supply request signal. Therefore, the predetermined time Tth is desirably set based on the approximate required time during which the vehicle runs from the location where the information display device 5 is set to the ground power supply apparatus 2A. The predetermined time Tth may be a fixed value set based on the required time from the location where the information display device 5 is set to the ground power supply apparatus 2A or may be changed in accordance with the road situation etc.

Figure 7:
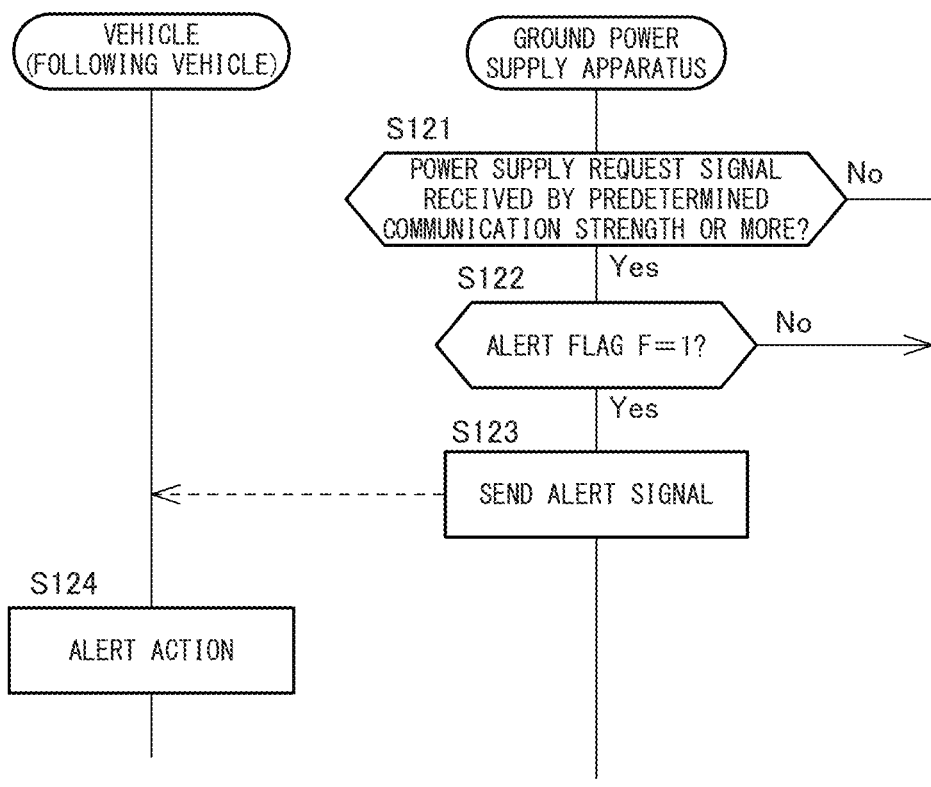
FIG. 7 is an operation sequence diagram for explaining the content of processing (computer program) according to a first embodiment of the present disclosure performed between a ground power supply apparatus and a following vehicle which has approached that ground power supply apparatus.

FIG. 7 is an operation sequence diagram for explaining the content of processing (computer program) performed between the ground power supply apparatus 2A explained above referring to FIG. 5 and the following vehicle 3B-1 approaching the ground power supply apparatus 2A.

At step S121, the power transmission control device 20 of the ground power supply apparatus 2A judges if it has received a power supply request signal by a predetermined communication strength or more. If receiving the power supply request signal by a predetermined communication strength or more, the power transmission control device 20 proceeds to the processing of step S122. On the other hand, if not receiving the power supply request signal by a predetermined communication strength or more, the power transmission control device 20 ends the current processing.

At step S122, the power transmission control device 20 of the ground power supply apparatus 2A judges whether the alert flag F has been set to 1. If the alert flag F has been set to 1, the power transmission control device 20 proceeds to the processing of step S123. On the other hand, if the alert flag F has been set to 0, the power transmission control device 20 ends the current processing.

At step S123, the power transmission control device 20 of the ground power supply apparatus 2A sends the following vehicle 3B-1 originating the power supply request signal an alert signal. At this time, the ground power supply apparatus 2A and the vehicle 3B-1 may communicate directly or may communicate indirectly through the server 1.

At step S124, if the vehicle control device 30 of the following vehicle 3B-1 receives an alert signal through the vehicle side communication device 32, it takes an alert action. In the present embodiment, as an alert action, the vehicle control device 30 displays an alert message notifying that there is an immobilized vehicle present on the electrified road ahead in the direction of vehicle advance on the display of the HMI device 35.

The ground power supply apparatus 2 according to the present embodiment explained above is provided with a ground side communication device 23 (communication device) able to communicate with a plurality of vehicles 3 (moving bodies), a power transmission device 22 for providing noncontact power supply to the vehicles 3, and a power transmission control device 20 (control device).

Further, the power transmission control device 20 is configured to judge whether it has received from one vehicle 3A among the plurality of vehicles 3 an immobilized vehicle signal (first signal) notifying it that the one vehicle 3A has become an immobilized state on the electrified road at which the ground power supply apparatus 2A has been set and, if it has received an immobilized vehicle signal and when receiving a power supply request signal requesting noncontact power supply at the ground power supply apparatus 2A from another vehicle 3B-1 among the plurality of vehicles 3, to send that other vehicle 3B-1 originating the power supply request signal an alert signal (second signal) notifying it that there is an immobilized vehicle 3A present on the electrified road.

Due to this, for example, if the vehicle 3B-1 is a manual driving vehicle, the driver of that vehicle 3B-1 can learn of the presence of the immobilized vehicle 3A in the power supply section of the ground power supply apparatus 2A at which the immobilized vehicle 3A has occurred before entering the power supply section. Further, for example, if the vehicle 3B-1 is an automated driving vehicle, the auto-mated driving system of that vehicle 3B-1 can learn of the presence of the immobilized vehicle 2A in the power supply section of the ground power supply apparatus 2A at which the immobilized vehicle 3A has occurred before entering the power supply section. For this reason, the driver or the automated driving system of the vehicle 3B-1 can drive the vehicle assuming the presence of the immobilized vehicle 3A, so it is possible to keep an accident etc. from occurring due to the immobilized vehicle 3A.

Further, the ground power supply apparatus 2A receiving the immobilized vehicle signal, that is, the ground power supply apparatus 2A at the power supply section of which an immobilized vehicle 3A has stopped, is made to send an alert signal to the following vehicle 3B-1 originating a power supply request signal so long as that power supply request signal is received by a predetermined communication strength or more, so it is possible to suitably alert the following vehicle 3B-1 with a high possibility of entering the power supply section at which the immobilized vehicle 3A is stopped.

Further, the power transmission control device 20 accord-ing to the present embodiment is further configured to send an information display instruction signal to an information display device 5 set on a road leading to an electrified road at which a ground power supply apparatus 2A is set for making the information display device 5 display the fact that there is an immobilized vehicle 3A present on the electrified road when receiving an immobilized vehicle signal (first signal).

Due to this, the information display device 5 can be made to display information notifying the presence of an immo-bilized vehicle 3A on an electrified road ahead in the direction of advance of the vehicle. For this reason, if the vehicle 3B-2 passing the information display device 5 after performing that display is a manual driving vehicle, the driver of the vehicle 3B-2 can learn earlier that there is an immobilized vehicle 3A present on the electrified road ahead in the direction of advance of the vehicle. Further, if the vehicle 3B-2 is an automated driving vehicle, by being able to send information relating to the display content from the information display device 5 to the vehicle 3 passing under the information display device 5, the automated driving system of the vehicle 3B-2 receiving the information can learn earlier that there is an immobilized vehicle 3A present on the electrified road ahead in the direction of advance of the vehicle.

Further, the power transmission control device 20 accord-ing to the present embodiment is further configured to calculate an elapsed time T from when sending an informa-tion display instruction signal and not to send an alert signal when receiving a power supply request signal from the elapsed time T becomes a predetermined time Tth or more. The predetermined time Tth is set based on a required time from a location of installation of an information display device 5 to the ground power supply apparatus 2A.

Due to this, it is possible to keep a following vehicle 3B-2 which had confirmed by the information display device 5 that an immobilized vehicle 3A has stopped on an electrified road from ending up being unnecessarily alerted.

Further, the power transmission control device 20 accord-ing to the present embodiment is further configured to take a power supply stop action for stopping noncontact power supply by the power transmission device 22 when receiving an immobilized vehicle signal (first signal).

Due to this, when the vehicle 3 falls in an immobilized state on the electrified road due to some sort of reason, it is possible to prevent occupants of the vehicle 3 from ending up being physically exposed to a leakage magnetic field even if the occupants of the vehicle exit the vehicle.

Second Embodiment

Next, a second embodiment of the present disclosure will be explained. The present embodiment differs from the first embodiment on the point of judging whether a vehicle 3 has fallen in an immobilized state at the ground power supply apparatus side. Below, the explanation will be given focus-ing on this point of difference.

Figure 8:
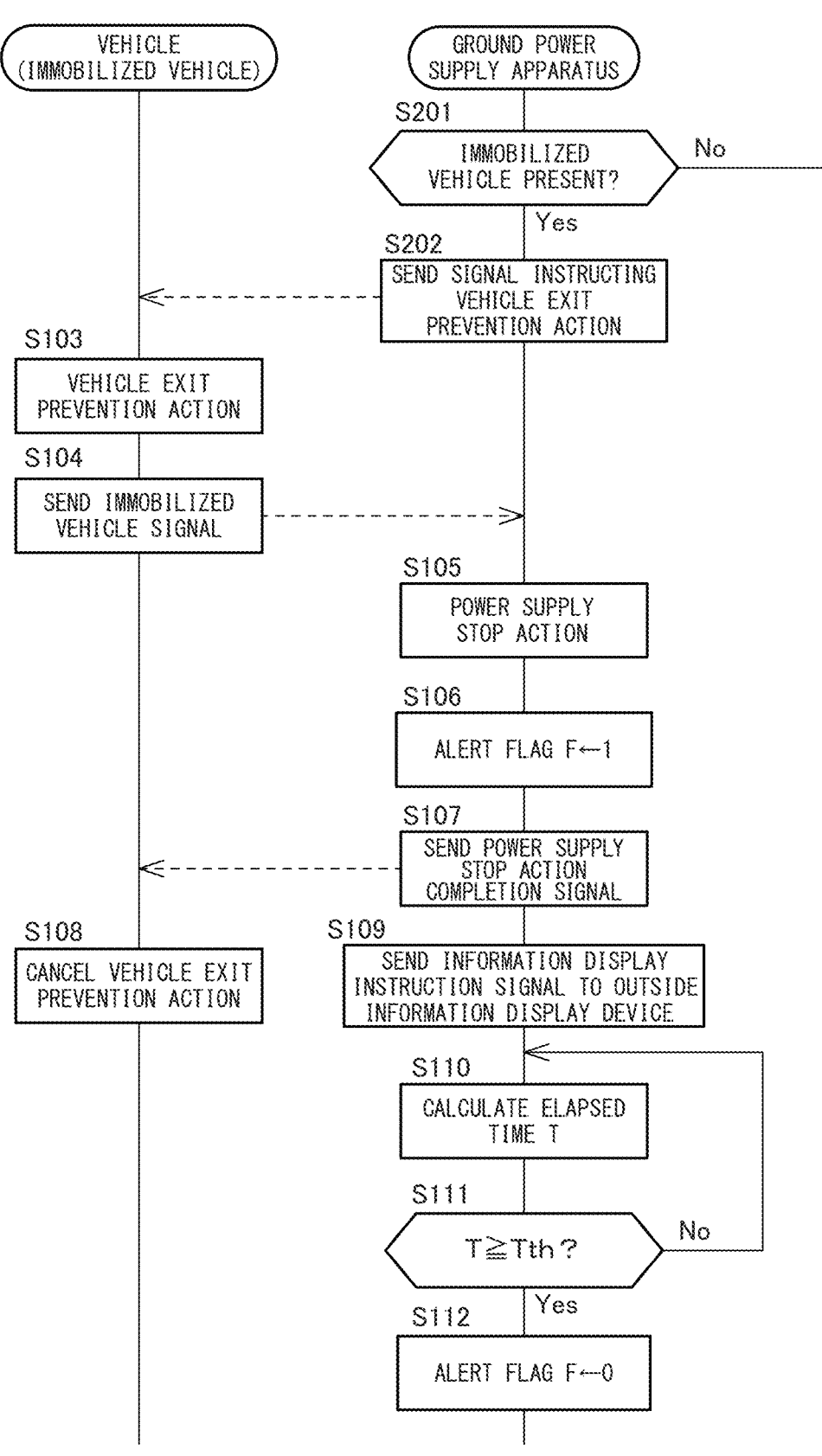
FIG. 8 is an operation sequence diagram for explaining the content of processing (computer program) according to a second embodiment of the present disclosure performed between a ground power supply apparatus and an immobilized vehicle falling in an immobilized state in a power supply section of that ground power supply apparatus.

FIG. 8 is an operation sequence diagram for explaining the content of the processing (computer program) according to the present embodiment performed between the ground power supply apparatus 2A and an immobilized vehicle 3A which has fallen in an immobilized state in the power supply section of the ground power supply apparatus 2A. Note that in FIG. 8, the content of the processing from step S103 to step S112 is similar to the first embodiment, so explanations will be omitted here.

At step S201, the power transmission control device 20 of the ground power supply apparatus 2A judges if there is an immobilized vehicle 3A which has fallen into an immobi-lized state present in the power supply section of the apparatus 2A. That judgment is, for example, performed periodically. If the power transmission control device 20 judges that there is an immobilized vehicle 3A present, it proceeds to the processing of step S202. On the other hand, if it judges that there is no immobilized vehicle 3A present, the power transmission control device 20 ends the current processing.

The method of judging whether there is an immobilized vehicle 3A present in the power supply section of the apparatus 2A is not particularly limited, but, for example, if the electrified road at which the apparatus 2A is installed is a road not considering supply of power to a parked vehicle (for example, a highway, vehicle only road, etc.), it is possible to judge this based on the time of transmission of power to the immobilized vehicle 3A. Specifically, if the time of transmission of power to the immobilized vehicle 3A is a predetermined time or more, it can be judged that rather than congestion etc. causing the time of transmission of power to become longer than usual, the vehicle has fallen in an immobilized state due to some sort of reason. Further, for example, if the ground power supply apparatus 2A is equipped with a camera or other imaging device (not shown) for confirming the state on the electrified road, this can be judged based on an image captured by the imaging device. In making these judgments, congestion information and other outside information may be further considered.

At step S202, the power transmission control device 20 of the ground power supply apparatus 2A takes action to stop the power supply and instructs the immobilized vehicle 3A to perform action to stop exiting so as to take such action to stop exiting. Specifically, the power transmission control device 20 sends the vehicle side communication device 32 of the immobilized vehicle 3A a signal instructing performance of action to stop exiting through the ground side communication device 23.

The power transmission control device 20 of the ground power supply apparatus 2 according to the present embodiment is configured to judge if a vehicle 3A (moving body) has fallen in an immobilized state on an electrified road at which the apparatus is installed and, if the vehicle 3A has fallen in an immobilized state on the electrified road, when receiving a power supply request signal requesting noncontact power supply at the ground power supply apparatus 2 from another vehicle 3B-1 among the plurality of the vehicles 3, send the other vehicle 3B-1 sending the power supply request signal an alert signal notifying it that there is a vehicle 3A which has fallen into an immobilized state present in the electrified road. In this way, even if judging whether the vehicle 3 has fallen in an immobilized state at the ground power supply apparatus side, it is possible to obtain actions and effects similar to the first embodiment.

Above, embodiments of the present disclosure were explained, but the above embodiments just show some of the examples of application of the present disclosure and are not intended to limit the technical scope of the present disclosure to the specific constitutions of the above embodiments.

For example, in the above embodiments, when receiving from a following vehicle 3B-1 a power supply request signal requesting noncontact power supply at the ground power supply apparatus 2, the vehicle 3B-1 was sent an alert signal, but the disclosure is not limited to a power supply request signal. For example, if sending some sort of signal from the vehicle 3 notifying the approach to the ground power supply apparatus 2, when receiving that signal, it is also possible to send an alert signal to the originator of that signal.

Further, the computer program which the power transmission control device 20 and the vehicle control device 30 run for alerting the following vehicle 3B of the immobilized vehicle 3A explained with reference to FIG. 6 to FIG. 8 may also be provided in a form recorded on a computer readable portable recording medium such as a semiconductor memory, magnetic recording medium, or optical recording medium.

The invention claimed is:

1. A ground power supply apparatus comprising:
a communication device configured to be able to communicate with a plurality of moving bodies;
a power transmission device configured to be able to supply power to a moving body by noncontact means; and
a control device, wherein
the control device is configured
so as to judge whether it has received from one moving body among the plurality of moving bodies a first signal notifying it that that one moving body has become an immobilized state on an electrified road in which the ground power supply apparatus is installed and,
if receiving the first signal, when receiving from another moving body among the plurality of moving bodies a power supply request signal requesting noncontact power supply at the ground power supply apparatus or an approach signal notifying it of approach to the other ground power supply apparatus, send to the other moving body originating the power supply request signal or approach signal a second signal notifying it of the presence of a moving body in an immobilized state on the electrified road.

2. The ground power supply apparatus according to claim 1, wherein
the control device is further configured so that, when receiving the first signal, it sends an information display device installed at a road leading to the electrified road a display instruction signal for making the information display device display that a moving body which has become an immobilized state is present on the electrified road.

3. The ground power supply apparatus according to claim 2, wherein
the control device is configured
so as to calculate an elapsed time from when sending the display instruction signal and,
when receiving the power supply request signal or the approach signal after the elapsed time has become a predetermined time or more, to not send the second signal.

4. The ground power supply apparatus according to claim 3, wherein
the predetermined time is set based on a required time from a location of installation of the information display device to the ground power supply apparatus.

5. The ground power supply apparatus according to claim 1, wherein
the control device is configured to take a power supply stop action for stopping noncontact power supply to the moving body from the power transmission device when receiving the first signal.

6. A ground power supply apparatus comprising:
a communication device configured to be able to communicate with a plurality of moving bodies;
a power transmission device configured to be able to supply power to a moving body by noncontact means; and
a control device, wherein
the control device configured
so as to judge whether a moving body has become an immobilized state on an electrified road in which the ground power supply apparatus is installed and,
if the moving body has become an immobilized state on an electrified road in which the ground power supply apparatus is installed, when receiving from another moving body among the plurality of moving bodies, a power supply request signal requesting noncontact power supply at the ground power supply apparatus or an approach signal notifying it of approach to the ground power supply apparatus, send to the other moving body originating the power supply request signal or approach signal a signal notifying it of the presence of a moving body in an immobilized state on the electrified road.

7. A power supply method by a ground power supply apparatus comprising a communication device configured to be able to communicate with a plurality of moving bodies, a power transmission device configured to be able to supply power to a moving body by noncontact means and a control device, wherein
the power supply method comprises
judging whether it has received from one moving body among the plurality of moving bodies a first signal notifying it that that one moving body has become an immobilized state on an electrified road in which the ground power supply apparatus is installed and, if receiving the first signal, when receiving from another moving body among the plurality of moving bodies a power supply request signal requesting noncontact power supply at the ground power supply apparatus or an approach signal notifying it of approach to the ground power supply apparatus, sending to the other moving body originating the power supply request signal or approach signal a second signal notifying it of the presence of a moving body in an immobilized state on the electrified road.

\*   \*   \*   \*   \*